US 6,603,571 B1

(12) United States Patent
Nomoto

(10) Patent No.: US 6,603,571 B1
(45) Date of Patent: Aug. 5, 2003

(54) INFORMATION PROCESSING APPARATUS, METHOD AND RECORDING MEDIUM THEREFOR

(75) Inventor: Masakazu Nomoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/386,350

(22) Filed: Aug. 31, 1999

(30) Foreign Application Priority Data

Sep. 1, 1998 (JP) ............................................. 10-247553

(51) Int. Cl.[7] .............................. G06F 3/12; G06F 13/00
(52) U.S. Cl. ..................................... 358/1.15; 358/1.14
(58) Field of Search .............................. 358/1.15, 1.13, 358/401, 403; 709/102, 103, 200, 224, 232; 710/1–7, 8, 15, 19, 31, 33; 382/100

(56) References Cited

U.S. PATENT DOCUMENTS 5,580,177 A * 12/1996 Gase et al. .................... 400/61
5,923,824 A * 7/1999 Yokomizo ..................... 395/109

* cited by examiner

Primary Examiner—Gabriel Garcia
Assistant Examiner—Douglas Tran
(74) Attorney, Agent, or Firm—FItzpatrick, Cella, Harper & Scinto

(57) ABSTRACT

An information processing apparatus that is adapted to perform a program installation is connected with an electronic device for input/output of a color image and is provided with a memory unit. When the apparatus discriminates that a selected color correction data file is not present in the memory unit, but is installed in another information processing apparatus, the selected color correction data file is transferred from the other information processing apparatus to the information processing apparatus.

9 Claims, 13 Drawing Sheets

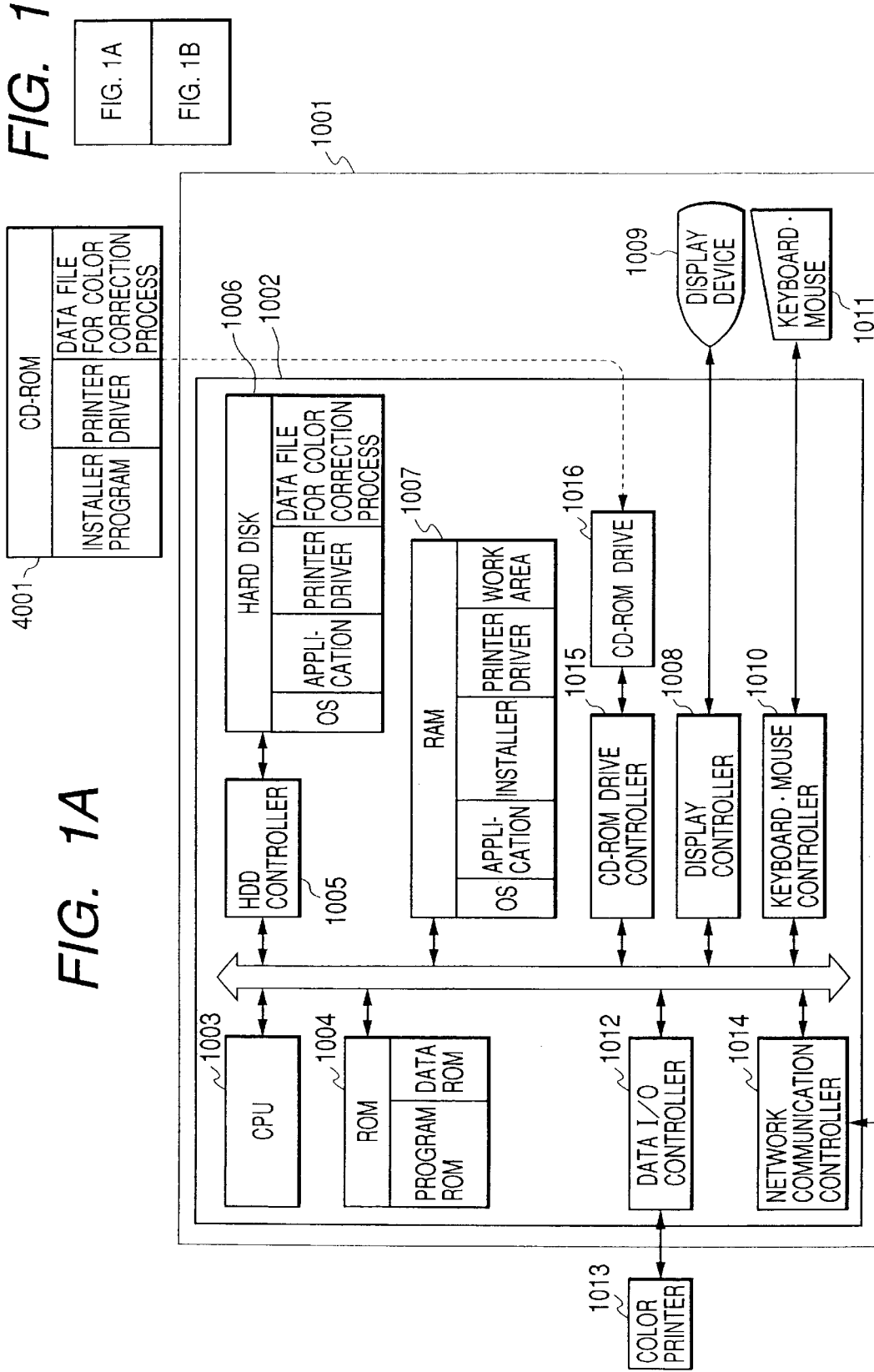

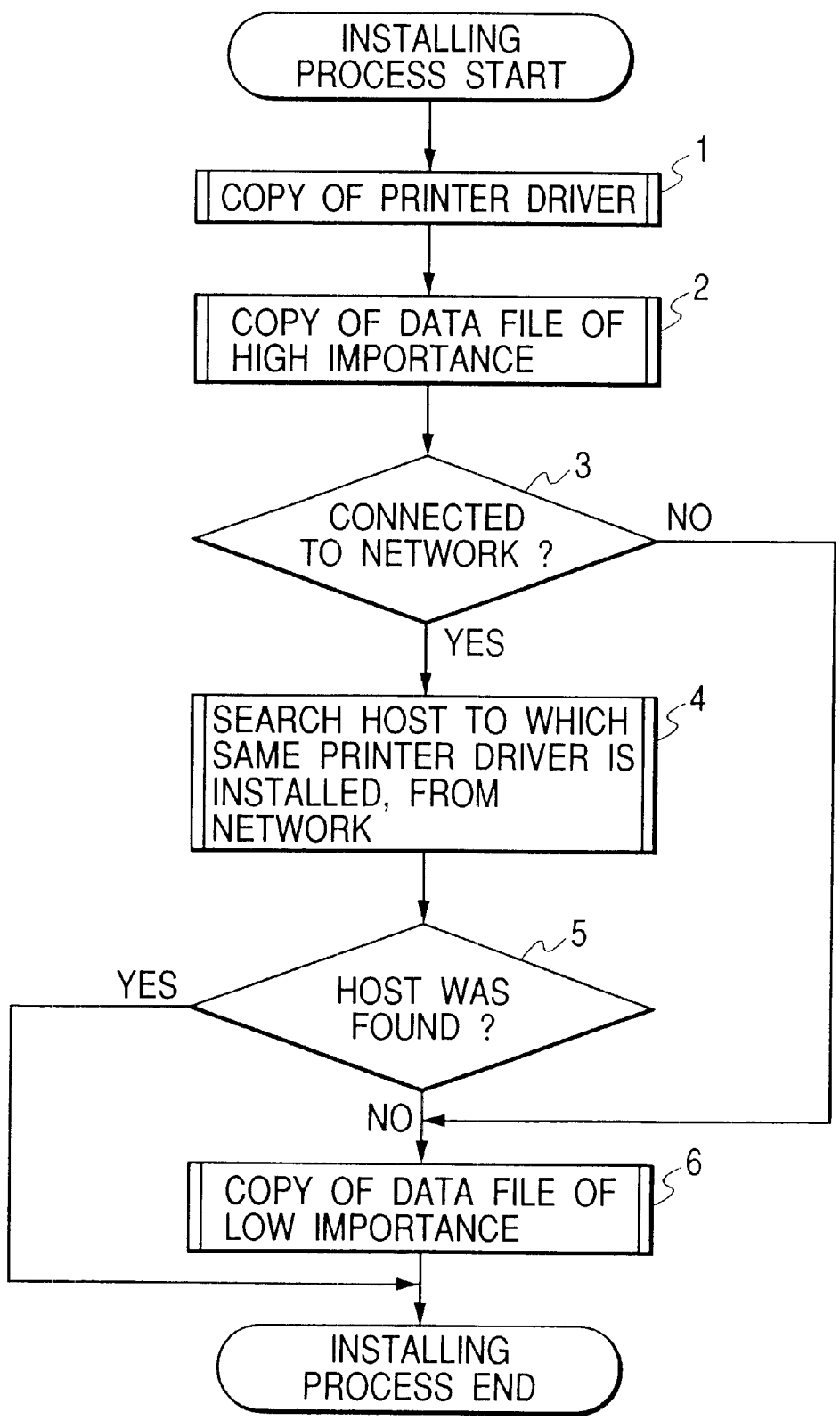

FIG. 6

| DATA FILE NAME (R1001) | FINAL USE DATE (R1002) |
|---|---|
| AAA | 97/11/08 13:20 |
| BBB | 97/11/07 11:28 |
| CCC | 97/11/08 15:44 |

MEMORY MAP OF STORAGE MEDIUM

FIG. 11

STORAGE MEDIUM OF
FD/CD-ROM AND SO ON

| DIRECTORY INFORMATION |
|---|
| FIRST INSTALLING PROCESS PROGRAM PROGRAM CODE GROUP CORRESPONDING TO STEP OF FLOW CHART SHOW IN FIG. 2 |
| FIRST COLOR CORRECTION PROCESS PROGRAM PROGRAM CODE GROUP CORRESPONDING TO STEP OF FLOW CHART SHOW IN FIG. 3 |
| FIRST UNINSTALLING PROCESS PROGRAM PROGRAM CODE GROUP CORRESPONDING TO STEP OF FLOW CHART SHOW IN FIG. 4 |
| SECOND INSTALLING PROCESS PROGRAM PROGRAM CODE GROUP CORRESPONDING TO STEP OF FLOW CHART SHOW IN FIG. 5 |
| SECOND COLOR CORRECTION PROCESS PROGRAM PROGRAM CODE GROUP CORRESPONDING TO STEP OF FLOW CHART SHOW IN FIG. 7 |
| SECOND UNINSTALLING PROCESS PROGRAM PROGRAM CODE GROUP CORRESPONDING TO STEP OF FLOW CHART SHOW IN FIG. 8 |
| THIRD COLOR CORRECTION PROCESS PROGRAM PROGRAM CODE GROUP CORRESPONDING TO STEP OF FLOW CHART SHOW IN FIG. 9 |
| DATA FILE GROUP FOR COLOR PROCESS |
|  |

MEMORY MAP OF STORAGE MEDIUM

INFORMATION PROCESSING APPARATUS, METHOD AND RECORDING MEDIUM THEREFOR

BACKGROUND OF THE INVENTION

1. Field of the Invention

The present invention relates to an information processing apparatus capable of program installation, a method and a recording medium therefor.

2. Related Background Art

In case of printing, with a color printer, an image prepared by a host computer such as a personal computer, the color reproduction of the output image may be different depending on the output conditions such as the kind of the color printer, kind of the printing medium to be used, image processing method by the printer driver etc.

Also the color reproduction may become different between the color image displayed on the display device of the host computer and that printed on the color printer, because of the difference in the reproducible color range among the devices such as the display device of the host computer and the color printer, or the difference in the color space employed in such device.

Also in case of inputting a color image from a color image input device such as a color scanner or a digital camera and outputting (printing or displaying) such color image with a color image output device such as a color printer or a color display, the color reproduction of the image may become different because of the difference in the reproducible color range of the devices such as the color image input device and the color image output device and the difference in the color space employed in such devices.

In the following explanation will be made particularly on a color printer, but it is applicable also to other color image output devices such as a color display or other color image input device such as a color scanner or a digital camera.

For compensating the above-mentioned difference in the color reproduction, there is executed a color correction by an operating system or a printer driver functioning on the host computer. In order to reflect the above-described output conditions on such color correction process, there is known a method, in executing the color correction process, of reading a data file describing the characteristics of the output colors of the color printer under the above-mentioned output conditions from a specified area of the external memory of the host computer and executing the color correction based on the data of such data file.

A color correction process employing a data file based on the ICC (International Color Consortium) profile format as the above-mentioned data is being employed in the color matching systems based on various operating systems.

FIG. 12 is a view showing the concept of the color matching system.

In order to execute color correction by such process under the various output conditions, it is necessary to prepare, in advance, the characteristics of the output colors in various combinations of the output conditions as data files in the external memory of the host computer.

For this reason, in installing the printer driver into the host computer, the entire data file group mentioned above is copied, together with the printer driver, in the external memory of the host computer. Also in the uninstallation of the printer driver, the entire group of the data files is deleted together with the printer driver.

The installation method, uninstallation method and color correction process are utilized also in case plural host computers on a network utilize color printers of a same kind. Thus, in the installation of the printer driver, the entire data file group is installed in the external memory of each host computer.

At the color correction process, the operating system or the printer driver executes color correction process on each host computer, independently from other host computers. At the uninstallation of the printer driver, the above-mentioned data file group stored in the external memory of each host computer is entirely deleted independently from other host computers.

The conventional color correction process described above allows to execute appropriate color correction under various printing conditions, utilizing the data file group mentioned above. However, such printing conditions amount to a very large number of combinations, and each data file corresponding to each printing condition has a large capacity, so that the entire data file group described above always occupies a very large area in the external memory of each host computer.

Also at the installation of the printer driver into each host computer, the data file group mentioned above has to be entirely installed. Consequently, a large data amount has to be transferred from the software distribution medium such as a CD-ROM to the external memory of the host computer, and a large amount of time is therefore required for installation.

These drawbacks are similarly encountered in an environment where plural host computers utilize the color printer of a same kind on a computer network.

SUMMARY OF THE INVENTION

The object of the present invention is to solve the above-mentioned drawbacks, thereby reducing the time required for installation.

The above-mentioned object can be attained, according to the present invention, by an information processing apparatus connected in communicable manner with an electronic device for inputting or outputting a color image and provided with a memory unit capable of installing a first control program for the electronic device and a color correction data file (data file for color correction process) associated with the first control program from a computer readable predetermined memory medium, the apparatus comprising:

first search means for searching, through a network, another information processing apparatus installed with a second control program for controlling an electric device similar in characteristics to the electronic device controlled by the first control program; and first control means for controlling use of the color correction data file stored in the predetermined memory medium, based on the search result obtained by the first search means.

According to the present invention there is also provided an information processing apparatus connected in communicable manner with an electronic device for inputting or outputting a color image and provided with a memory unit in which a first control program for the electronic device and plural color correction data files associated with the first control program are installed from a computer readable predetermined memory medium, the apparatus comprising:

second search means for searching, through a network, another information processing apparatus installed with a second control program for controlling an electric device similar in characteristics to the electronic device controlled by the first control program; and second control means for executing transfer control on the plural color correction data files to another information processing apparatus searched by the second search means.

According to the present invention there is also provided an information processing apparatus connected in communicable manner with an electronic device for inputting or outputting a color image and provided with a memory unit in which a first control program for the electronic device and plural color correction data files associated with the first control program are installed from a computer readable predetermined memory medium and adapted to execute a color correction process based on any of the plural color correction data files, the apparatus comprising:

selection means for selecting any of the color correction data files according to the condition of a color image processing executed by the electronic device;

first discrimination means for discriminating whether the color correction data file selected by the selection means is present in the memory unit;

third search means adapted, in case the first discrimination means discriminates that the color correction data file selected by the selection means is not present in the memory unit, to search another information processing apparatus installed with a second control program for controlling an electronic device similar in characteristics to the electronic device controlled by the first control program;

second discrimination means for discriminating whether the color correction data file selected by the selection means is installed in another information processing apparatus searched by the third search means; and transfer means adapted, in case the second discrimination means discriminates that the color correction data file selected by the selection means is installed in the another information processing apparatus, to transfer the color correction data file selected by the selection means from the another information processing apparatus to the information processing apparatus itself.

Other objects of the present invention, and the features thereof, will become fully apparent from the following detailed description which is to be taken in conjunction with the attached drawings.

BRIEF DESCRIPTION OF THE DRAWINGS

FIG. 2 is a flow chart showing a first installing method;

FIG. 6 is a view showing the data configuration in a table file;

FIGS. 10 and 11 are views showing a memory map of a memory medium storing various data processing programs readable by an image output apparatus.

DETAILED DESCRIPTION OF THE PREFERRED EMBODIMENTS

First Embodiment

In the following there will be explained in detail an embodiment of the present invention, with reference to the attached drawings.

[System Configuration]

Figure 1B:
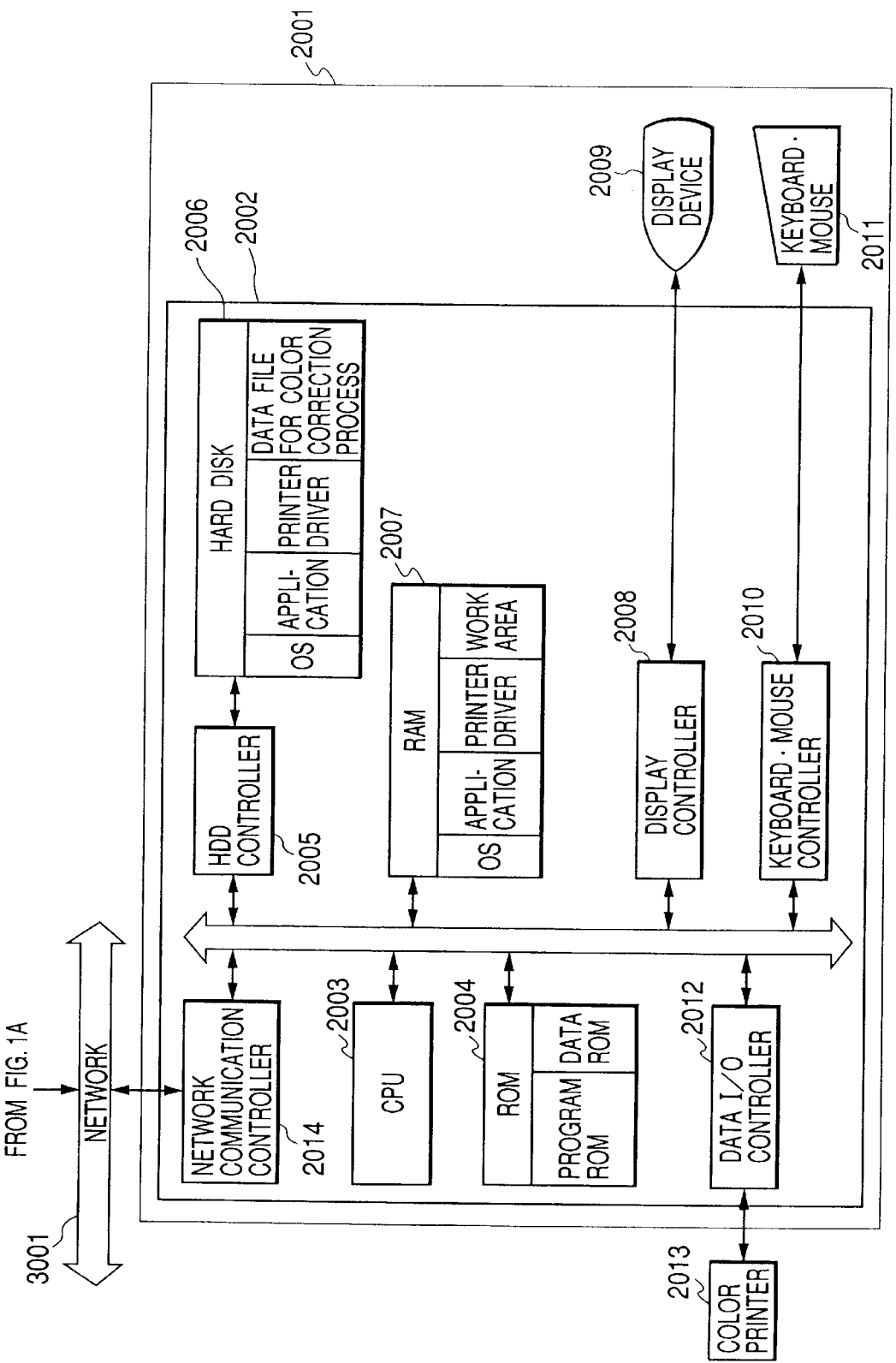
FIG. 1 which is comprised of FIGS. 1A and 1B are block diagrams showing the configuration of a computer system in which the information processing apparatus constituting a first embodiment of the present invention is applicable.

FIGS. 1A and 1B are block diagrams showing the configuration of a computer system in which the information processing apparatus constituting a first embodiment of the present invention is applicable.

Referring to FIGS. 1A and 1B, a host computer 1001 is to be subjected to the installation of a printer driver of the present embodiment and associated color correction data files, also executes color correction process utilizing such printer driver and the associated color correction data files, and also is to be subjected to the uninstallation of the printer driver and the associated color correction data files. Another host computer 2001 is connected with the host computer 1001 by a computer network 3001.

CPU's 1003, 2003 respectively control the host computers 1001, 2001. ROM's 1004, 2004 store programs for controlling various controllers in the host computers 1001, 2001 and data to be utilized in such programs. These programs are executed by the CPU's 1003, 2003 of the host computers.

Hard disk drive controllers 1005, 2005 execute data access control respectively for hard disks 1006, 2006, which store operating system, application softwares, printer drivers for controlling the printing operation by a color printer to be explained later, and color correction data files (profiles) to be employed in the color correction process executed in conjunction with the printing operation respectively on the host computers 1001, 2001.

In particular, for the printer drivers and the color correction data files, the storage areas therefor in the hard disks 1006, 2006 are designated by the operating system.

RAM's 1007, 2007 are subjected to the loading of various softwares such as the operating systems, application softwares, printer drivers etc. respectively from the hard disks 1006, 2006 through the hard disk drive controllers (HDD controllers) 1005, 2005, and such softwares are executed respectively by the CPU's 1003 2003.

Work areas in the execution of each software are secured in the RAM's 1007, 2007. Also at the installation of the printer driver into the host computer 1001, an installer program is loaded in the RAM 1007 and is executed by the CPU 1003.

Display controllers 1008, 2008 execute image displays for the user by display devices 1009, 2009 from the host computers 1001, 2001 respectively under the control of the CPU's 1003, 2003. Keyboard mouse controllers 1010, 2010 receive inputs from the users by keyboard mice 1011, 2011 for the host computers 1001, 2001, respectively under the control of the CPU's 1003, 2003.

The users of the host computers 1001, 2001 execute interactive operations therefor, utilizing the display devices 1009, 2009 and the keyboard mice 1011, 2011.

Data I/O (input/output) controllers 1012, 2012 execute communication respectively with color printers 1013, 2013 connected to the host computers 1001, 2001 under the control of the CPU's 1003, 2003. The color printers 1013, 2013 execute image printing according the input data respectively from the host computers 1001, 2001.

Network communication controllers 1014, 2014 are connected to the computer network 3001 and realize communication function of the host computers 1001, 2001 with other host computers through the computer network 3001, respectively under the control of the CPU's 1003, 2003.

A CD-ROM drive controller 1015 controls the data reading from a CD-ROM drive 1016 under the control of the CPU 1003.

A CD-ROM 4001 installed in the host computer 1001 stores a printer driver which is a software for controlling the color printer 1013, associated plural color correction data files, an installer program for installing these softwares etc., and can be read through a CD-ROM drive 1016. Among these, the plural color correction data files mentioned above are classified into a group of higher importance and a group of lower importance according to the anticipated frequency of use.

[Process Operations]

In the following there will be explained, with reference to FIG. 2, a first installing method of the printer driver and the color correction data files into the host computer 1001 in the computer system shown in FIGS. 1A and 1B.

FIG. 2 is a flow chart showing an example of a first installing method and corresponding to the sequence of installation of the printer driver and the color correction data files associated therewith, wherein 1 to 6 indicate process steps.

When the user of the host computer 1001 inserts the CD-ROM 4001 into the CD-ROM drive 1016 and instructs the start of installation with the keyboard mouse 1011, the installer program stored in the CD-ROM 4001 is loaded into the RAM 1007 and the execution by the CPU 1003 is started.

At first the installer program copies the printer driver, stored in the CD-ROM 4001, in a printer driver storage area in the hard disk 1006 (step 1), and then forcedly copies, among the color correction data files stored in the CD-ROM 4001, those of higher importance into a color correction data file storage area in the hard disk 1006 (step 2).

Then there is discriminated whether the host computer 1001 is connected to the computer network (step 3), and, if not connected, the sequence proceeds to a step 6 to be explained later.

On the other hand, if the step 3 identifies that the host computer 1001 is connected to the computer network, the sequence proceeds to a next step 4. It is assumed that the network detected above is the computer network 3001 shown in FIGS. 1A and 1B.

Then a step 4 utilizes the network communication function of the operating system to search, among the computer network 3001, other host computers in which the printer driver same as the above-mentioned is installed.

The above-mentioned search for the host computers is made within a range managed by a server under which the host computer 1001 is managed. However the range of search for other host computers may be manually designated by the user.

Then there is discriminated whether the search in the step 4 has found another host computer mentioned above step 5, and, if found, the installing process is terminated.

On the other hand, if the step 5 identifies that such another host computer has not been found, the color correction data files of lower importance, not copied in the aforementioned step 2 are copied from the CD-ROM 4001 to the color correction data file storage area in the hard disk 1006 step 6, whereupon the installing process of the printer driver and the associated color correction data files is terminated.

In case the foregoing step 3 identifies that the host computer 3001 is not connected to the computer network, it is not possible to share the color correction data files with other host computers through the computer network. Consequently the step 6 is executed after the step 2 to copy all the data files required for the color correction process in the hard disk 1006 of the host computer 1001.

Also in case the step 5 does not find, in the computer network 3001, other host computers in which the same printer driver as that copied in the step 1 has been installed, the data files required for the color correction process in the computer 1001 are absent in the computer network 3001 so that the steps 1, 2 and 6 are executed to copy all the data files required for the color correction process are copied into the hard disk 1006 of the host computer 1001.

The situation where the step 5 finds another host computer mentioned above corresponds to the following case (i) or (ii) as long as the present installing method, the color correction process and the uninstalling method are used in combination:

(i) a situation where the data files of lower importance among those required for the color correction process have already been copied in the hard disk of another host computer searched in the step 4; or (ii) a situation where still another third host computer is present on the computer network 3001 in addition to another host computer searched in the step 4 and the data files of lower importance among those required for the color correction process were already copied in the hard disk of such third host computer, prior to the installation of the printer driver in the another host computer mentioned above.

In such case (i) or (ii), therefore, among the data files required for the color correction process, those of lower importance can be shared with other host computer through the computer network 3001 and need not be stored in the hard disk of the host computer 1001. Consequently the step 6 is not executed, thereby dispensing with the copying of the data files of lower importance.

It is thus rendered possible to reduce the area occupied by the data files in the hard disk 1006 and to dispense with the copying time (execution of the step 6) for the data files of lower importance.

Also the copying may be dispensed with, under similar conditions, for the data files of higher importance which are copied in the step 2. In the present embodiment, however, the data files of higher importance are copied at the installation, in order to reduce the possibility of prolonging the color correction time by copying the data files of higher probability of use through the computer network in the course of the color correction process to be explained later.

The installation of the printer driver and the color correction data files mentioned above may be conducted by the installer program distributed together with the printer driver, or by the operating system.

In the foregoing description, the color correction data files of lower importance, not copied in the step 2, are copied in the step 6 from the CD-ROM 4001 into the color correction data file storage area of the hard disk 1006 in case the step 5 has not found another host computer. It is also possible, however, that such color correction data files of lower importance are not copied into the hard disk 1006 at the installing operation but are used by reading from the CD-ROM 4001 or another memory medium at the execution of the color correction process.

In the following there will be detailedly explained, with reference to a flow chart in FIG. 3, a first color correction process in data output from the host computer 1001 to the color printer 1013. It is assumed that the color printer 1013 is controlled by the printer driver that has been installed according to the flow chart shown in FIG. 2.

Figure 3:
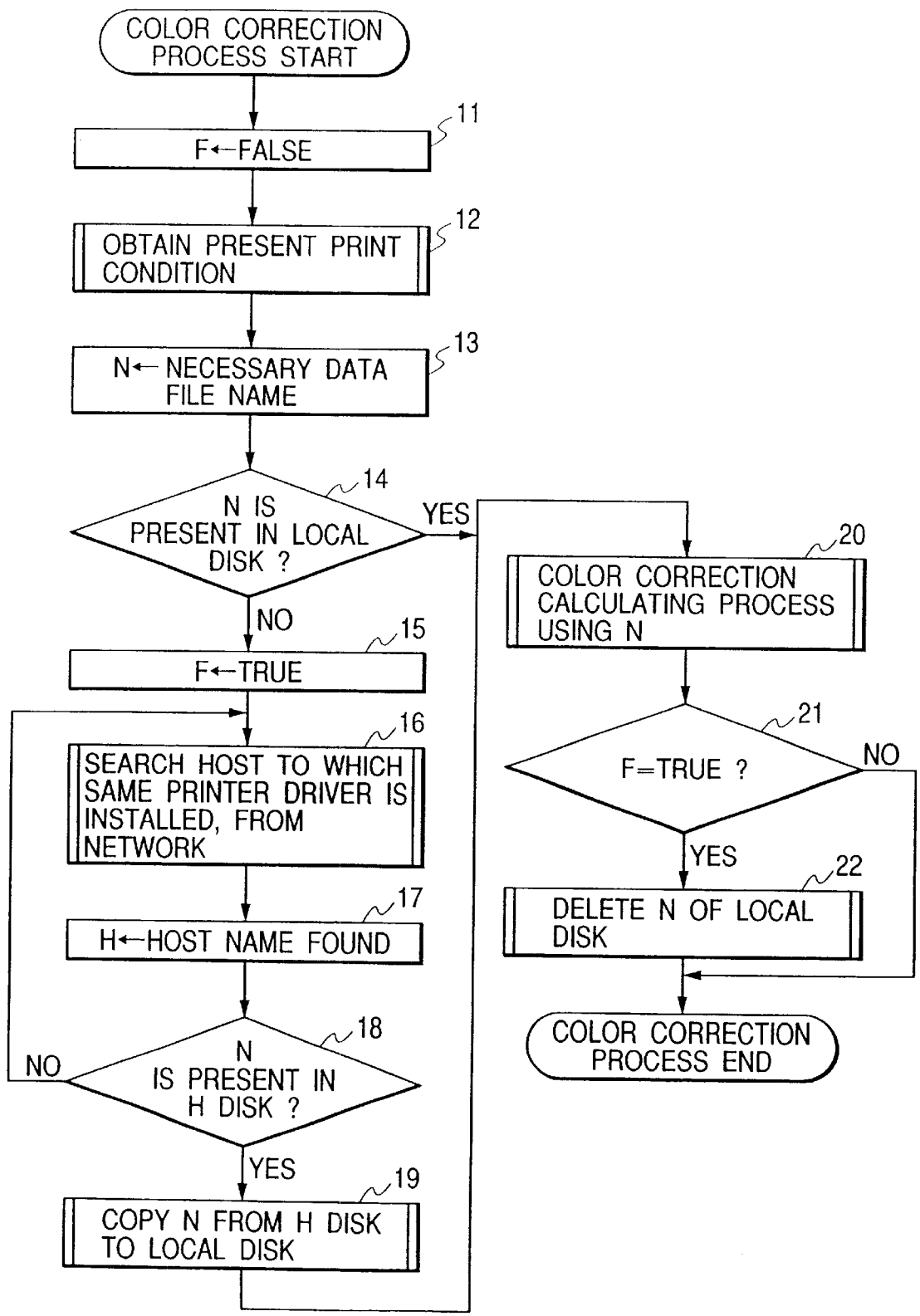
FIG. 3 is a flow chart showing a first color correction method.

FIG. 3 is a flow chart showing the first color correction process, corresponding to the sequence of color correction in the printing operation with the printer driver and the associated color correction data files installed according to the process shown in FIG. 2, wherein 11 to 22 indicate process steps.

When the color correction sequence of the printer driver is called by the execution of the printing process by an application software loaded on the RAM 1007 shown in FIGS. 1A and 1B, a flag variable F is initialized to FALSE step 11. This variable F indicates whether a file transfer, to be explained later, is to be executed or not.

Then acquired are printing conditions, such as the printing medium for printing, image processing method by the printer driver, kind of the ink to be used etc. step 12. Then, based on the printing conditions, a data file name required in the color correcting calculation to be explained later is selected and is stored in a character train variable N step 13.

Then there is discriminated whether the data file of the file name N selected in the step 13 is present in the color correction data file storage area in the hard disk 1006 of the host computer 1001 in step 14, and, if present, the sequence proceeds to a step 20, but, if absent, a step 15 is executed.

A next step 15 changes the flag variable F to TRUE, indicating the execution of file transfer in the succeeding steps.

Then the network communication function of the operating system is used to search, in the computer network 3001, another host computer in which the printer driver, same as the above-mentioned one, has already been installed step 16. It is assumed that the host computer searched in this step is the host computer 2001 shown in FIGS. 1A and 1B.

Then the host name of the host computer 2001 found in the step 16 is stored in a character train variable H step 17, and the network communication function of the operating system is used to discriminate (search) whether the data file of the file name N is present in the color correction data file storage area in the hard disk 2006 of the host computer 2001 step 18. If absent, the sequence returns to the step 16 to search still another host computer satisfying the search condition of the step 16.

On the other hand, if the step 18 identifies the data file N in the host computer H, the sequence proceeds to a next step 19.

In the step 19, the network communication function of the operating system is used to transfer the data file of the fine name N selected in the step 13, from the hard disk 2006 of the host computer 2001 searched n the step 16 to the hard disk 1006 of the host computer 1001.

Then, in a step 20, the data file of the file name N selected in the step 13 is read from the hard disk 1006, and there is executed the color correction calculation optimum for the printing conditions acquired in the step 12. Then there is discriminated, in a step 21, whether the flag variable F is TRUE, namely whether the file transfer has been executed through the computer network by the sequence of the steps 15 to 19. If F is TRUE, the copy of the data file N in the hard disk 1006 is deleted step 22 and the color correction process by the printer driver is terminated.

On the other hand, if F is FALSE in the step 21, the color correction process is terminated.

In the foregoing process, if the step 14 identifies that the color correction data file N is present in the hard disk 1006 of the host computer 1001, the color correction calculation utilizing such data file N can be immediately executed by the CPU 1003 and the sequence of the steps 15 to 19 is unnecessary and is not executed. Also the file deletion in the step 22 is unnecessary.

On the other hand, in case the step 14 identifies that the color correction data file N is absent in the hard disk 1006, such data file should be present in another host computer and to be shared through the computer network 3001.

Therefore the sequence of the steps 15 to 19 is executed to search and copy the data file N into the hard disk 1006, thereby enabling the color correction calculation by the data file N in the step 20. Such data file N, becoming unnecessary after the color correction process, is deleted in the step 22.

The color correction calculation of the step 20 may be executed not only in the printer driver but also by a color processing function provided by the operating system or by another color processing software.

As explained in the foregoing, search can be made efficiently since the search in the steps 14 and 18 is executed in a limited range, based on the kind of the data files (color correction data files in the present embodiment) of lower importance.

In the following there will be detailedly explained, with reference to a flow chart in FIG. 4, a first uninstalling method of the printer driver and the associated color correction data files from the host computer 1001. It is assumed that the printer driver and the associated color correction data files mentioned above have been installed according to the flow chart shown in FIG. 2 and may have been utilized in the color correction according to the flow chart shown in FIG. 3.

Figure 4:
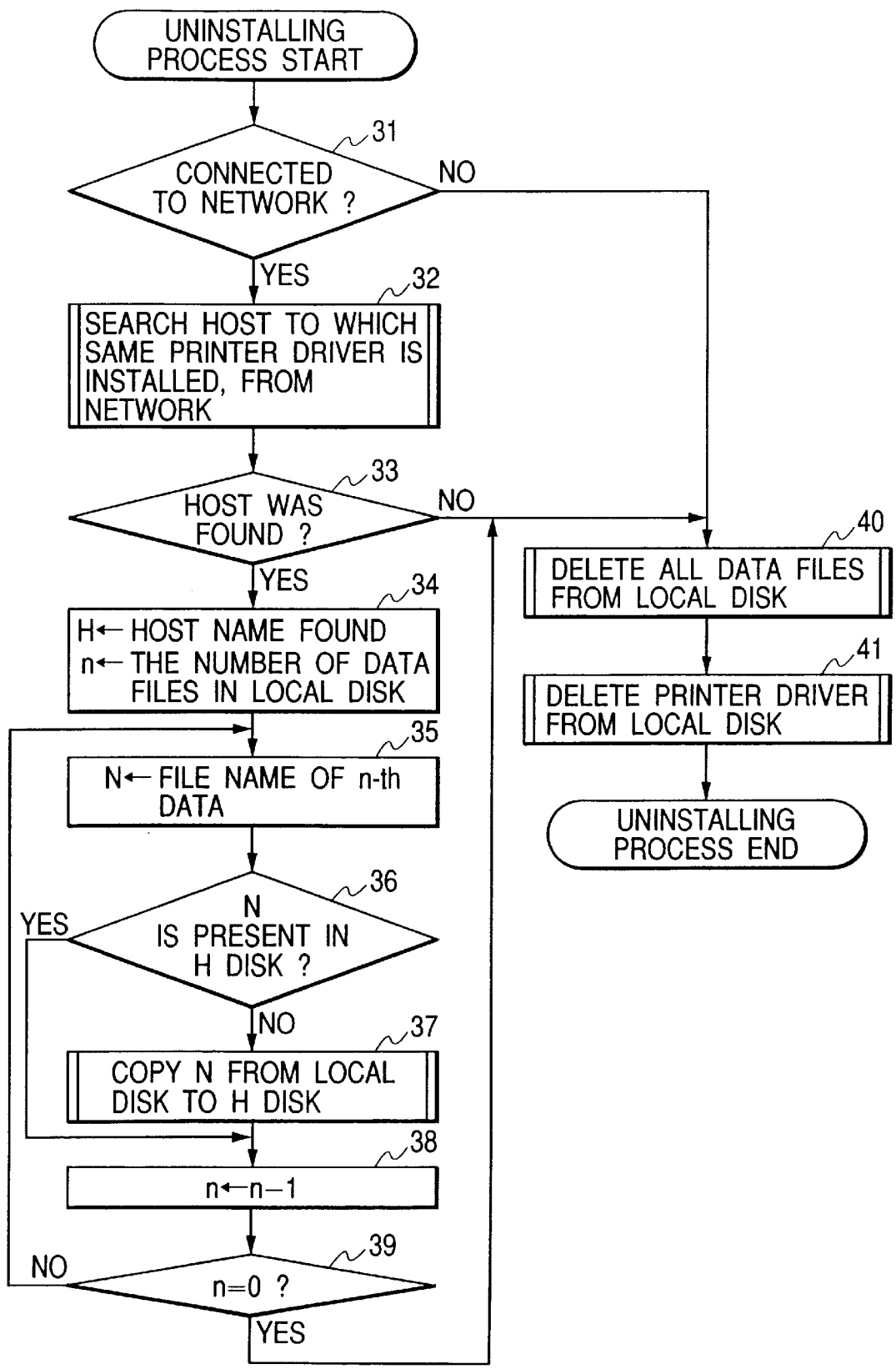
FIG. 4 is a flow chart showing a first uninstalling method.

FIG. 4 is a flow chart showing the first uninstalling method, corresponding to the sequence of uninstalling sequence of the printer driver and the associated color correction data files from the host computer 1001, wherein 31 to 41 indicate process steps.

When the user of the host computer 1001 instructs the start of uninstallation with the keyboard mouse 1011, the printer driver stored in the hard disk 1006 is loaded in the RAM 1007 and the execution of the following uninstalling sequence is started by the CPU 1003.

At first there is discriminated whether the host computer 1001 is connected to a computer network S31, and, if not connected, the sequence proceeds to a step 40 to be explained later, but if connected, the sequence proceeds to a next step 32. It is assumed that the network detected above is the computer network 3001 shown in FIGS. 1A and 1B.

Then a step 32 utilizes the network communication function of the operating system to search, among the computer network 3001, other host computers in which the computer driver same as the above-mentioned is installed.

In case the step 32 does not find such other host computers, the sequence proceeds to a step 40 to be explained later, but, if another host computer is found, the sequence proceeds to a next step 34. It is assumed that such another host computer is the host computer 2001 shown in FIGS. 1A and 1B.

In a next step 34, the host name of the host computer 2001 searched in the step 32 is stored in the character train variable H, and the number of the color correction data files associated with the printer driver present in the hard disk 1006 is stored in an integer variable n. The integer variable n indicates the remaining number of the color correction data files, to be subjected to the sequence in following steps 35 to 39.

In a next step 35, the file name of an n-th file among the above-mentioned color correction data files is stored in the character train variable N.

Then the network communication function of the operating system is used to discriminate (search), in a step 36, whether a data file with the file name N is present in the color correction data file storage area in the hard disk 2006 of the host computer 2001, and, if present, the sequence proceeds to a step 38 but, if absent, the sequence proceeds to a next step 37.

Then the network communication function of the operating system is used, in a step 37, to transfer the data file of the file name N from the hard disk 1006 of the host computer 1001 to the hard disk 2006 of the host computer 2001 searched in the step 32.

Then the value of the variable n is decreased by one 38 and there is discriminated if the variable n is "0" 39. If not, the sequence returns to the step 35 to execute the process for a next data file.

On the other hand, if the step 39 identifies that the variable n is "0", the sequence proceeds to a next step 40 since the process for all the data files has been completed.

A next step 40 deletes all the color correction data files associated with the printer driver and present in the hard disk 1006.

Then the printer driver itself present in the hard disk 1006 is deleted 41, whereupon the uninstalling process for the printer driver and all the associated color correction data files is terminated.

In the foregoing uninstalling process, in case the step 31 identifies that the host computer 1001 is not connected to the computer network or the step 33 identifies that another host computer installed with the printer driver same as that for uninstallation is not present in the computer network 3001, the color correction data files are not shared with other host computers so that the printer driver and the data files to be uninstalled from the hard disk 1006 can be immediately deleted.

In case the step 33 identifies that another host computer installed with the same printer driver as that for uninstallation is present in the computer network 3001, the color correction data files to be uninstalled may be shared with such another host computer through the computer network 3001, so that the deletion of such data files from the hard disk 1006 may result in the total absence of such data files from the computer network 3001.

For this reason, the sequence of the steps 34 to 40 is executed to find another host computer present in the computer network 3001 and installed with the printer driver same as that for uninstallation and to copy such data files in such another host computer thereby avoiding the loss of the data files.

Also, in the above-mentioned copying, the transfer control step 36 to discriminate whether the data files to be transferred are already present in the host computer of copying destination, thereby avoiding the unnecessary file transfer and increasing the speed of uninstallation.

The above-described uninstallation of the printer driver and the associated color correction data files may be executed not only in the printer driver but also by an exclusive uninstalling program or by the operating system.

Second Embodiment

In the foregoing first embodiment, there has been explained a case in which the uninstalling method is used in combination with the installing method and the color correction method. There may however be employed an embodiment capable of restoring the data files that might have been lost in the deletion of the data files not by the uninstalling method described in the first embodiment, and such embodiment will be explained in the following.

As explained above, the first embodiment is based on the combined use of the uninstalling method with the installing method and the color correction method. Therefore, if the color correction data files are deleted not by the uninstalling method of the first embodiment, such data files may be lost from the computer network. In case the installer in the method of the first embodiment is used, if the data files are lost, the appropriate color correction process cannot be executed unless the printer driver is uninstalled and then installed again in all the host computers installed with the printer driver utilizing such data files.

In the following there will be explained, with reference to a flow chart in FIG. 5, a second installing method of the printer driver and the color correction data files into the host computer 1001 in the computer system shown in FIGS. 1A and 1B.

Figure 5:
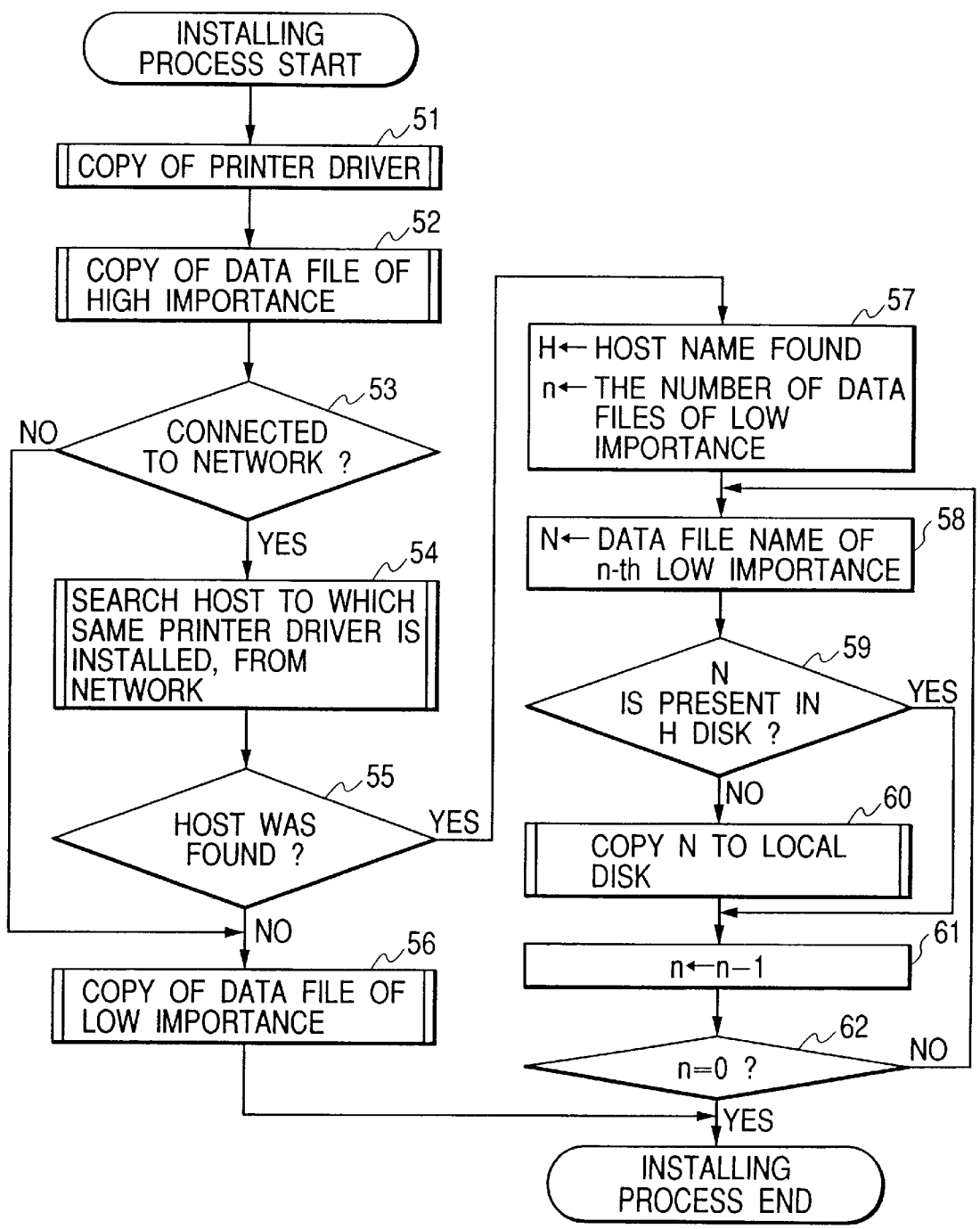
FIG. 5 is a flow chart showing a second installing method.

FIG. 5 is a flow chart showing an example of a second installing method, corresponding to the sequence of installation of the printer driver and the color correction data files associated therewith, wherein steps 51 to 62 indicate process steps.

The steps 51 to 54 and 56 in FIG. 5 are respectively same as steps 1 to 4 and 6 in FIG. 2.

When the user of the host computer 1001 inserts the CD-ROM 4001 into the CD-ROM drive 1016 and instructs the start of installation with the keyboard mouse 1011, the installer program stored in the CD-ROM 4001 is loaded into the RAM 1007 and the execution by the CPU 1003 is started.

At first the installer program copies the printer driver, stored in the CD-ROM 4001, in a printer driver storage area in the hard disk 1006 51, and then forcedly copies, among the color correction data files stored in the CD-ROM 4001, those of higher importance into a color correction data file storage area in the hard disk 1006 52.

Then there is discriminated whether the host computer 1001 is connected to the computer network 53, and, if not connected, the sequence proceeds to a step 56 to be explained later.

On the other hand, if the step 53 identifies that the host computer 1001 is connected to the computer network, the sequence proceeds to a next step 54. It is assumed that the network detected above is the computer network 3001 shown in FIGS. 1A and 1B.

Then a step 54 utilizes the network communication function of the operating system to search, among the computer network 3001, other host computers installed with the computer driver same as the above-mentioned one.

Then there is discriminated whether the search in the step 54 has found another host computer mentioned above step 55, and, if found, the process is not terminated but proceeds to a step 57.

On the other hand, if the step 55 identifies that such another host computer has not been found, the color correction data files of lower importance, not copied in the aforementioned step 52 are copied from the CD-ROM 4001 to the color correction data file storage are in the hard disk 1006 56, whereupon the installing process is terminated.

In a step 57, the network communication function of the operating system is used to store the host name of the other host computer thus found in a character train variable H, to store the number of the color correction data files of lower importance in an integer variable n, not copied in step 52, and to store the file name of an n-th one among such data files of lower importance in a character train variable N step 58.

Then the network communication function of the operating system is used to discriminate (search) whether the file of the file name N is present in the color correction data file storage area in the hard disk of the host computer H step 59, and, if present, the sequence proceeds to a step 61, but, if absent, a next step 60 is executed.

A step 60 copies the color correction data file N from the CD-ROM 4001 into the hard disk 1006.

Then the value of the variable n is decreased by one step 61, and there is discriminated whether the variable n is "0" step 62, and if "0", the installing process is terminated.

If the variable n is not "0" in the step 62, the sequence returns to the step 8 to execute the process for a next data file.

In the above-described flow, the steps 57 to 62 discriminate whether the data files of lower importance are present in the host computer H searched in the computer network in the step 54, and, if absent, such data files are copied in the hard disk of the host computer 1001. Through such copying process, all the data files become present in at least either of the host computer 1001 and the host computer H (another host computer installed with the same printer driver in the network).

The above-described process allows to restore the data files that may have been lost by the deletion of the data files not by the uninstalling method of the first embodiment.

In the present embodiment, the color correction data files of lower importance, not copied in the step 52, are copied in the step 56 from the CD-ROM 4001 into the color correction data file storage area of the hard disk 1006 in case the step 55 has not found another host computer. It is also possible, however, that such color correction data files of lower importance are not copied into the hard disk 1006 at the installing operation but are used by reading from the CD-ROM 4001 or another memory medium at the execution of the color correction process.

Third Embodiment

In the foregoing first embodiment, there has been explained a case in which the data files classified as of lower importance are used in the color correction process, such data files are copied from another host computer. There may however be employed an embodiment capable, even among the data files classified as of lower importance at the installation, of retaining the data files of higher frequency of use in the hard disk, and such embodiment will be explained in the following.

FIG. 6 is a view showing the data configuration in a table file which is prepared in the hard disk 1006 in case the step 5 in FIG. 2 finds, in the network 3001, a host computer installed with the same printer driver.

In FIG. 6, a data file name column R1001 records the file names of the color correction data files present in the hard disk 1006. A final use data column R1002 records the date and time of installation, in connection with each file name recorded in the data file name column R1001.

The above-described table file is used, at the color correction process to be explained later, for evaluating the importance of each data file in each host computer, independently from the aforementioned importance defined in advance and used at the installing operation.

In the foregoing first embodiment, as explained in the foregoing, if the data files necessary for the color correction process are absent in the local hard disk, they are copied from another host computer through the network but thus copied data files are deleted after the completion of the color correction process. Therefore, in any host computer in which all the color correction data files have not been copied at the installation of the printer driver, in case of using the data files classified as of lower importance at the installation, such data files have to be copied regardless of the actual frequency of use of such data files.

In the present embodiment there are executed the following process in addition to the process of the first embodiment.

At first, in case the step 5 in FIG. 2 finds a host computer installed with the same printer driver, a table file as shown in FIG. 6 is prepared in the hard disk 1006. In the table file, the file names of the color correction data files present in the hard disk 1006 are recorded in the column R1001. Also the date and time of installation is recorded in the final use date column R1002, in connection with each file name.

This table file is used, at the color correction process to be explained later, for evaluating the importance of each data file in each host computer, independently from the aforementioned importance defined in advance and used at the installing operation.

In the following there will be explained, with reference to a flow chart shown in FIG. 7, a second color correction method in the image output from the host computer 1001 shown in FIGS. 1A and 1B to the color printer 1013. It is assumed that the printer driver for controlling the color printer 1013 is installed according to the flow chart shown in FIG. 2 and that a table file as shown in FIG. 6 is prepared in the hard disk 1006 in case the step 5 in FIG. 2 finds another host computer installed with the same printer driver.

Figure 7:
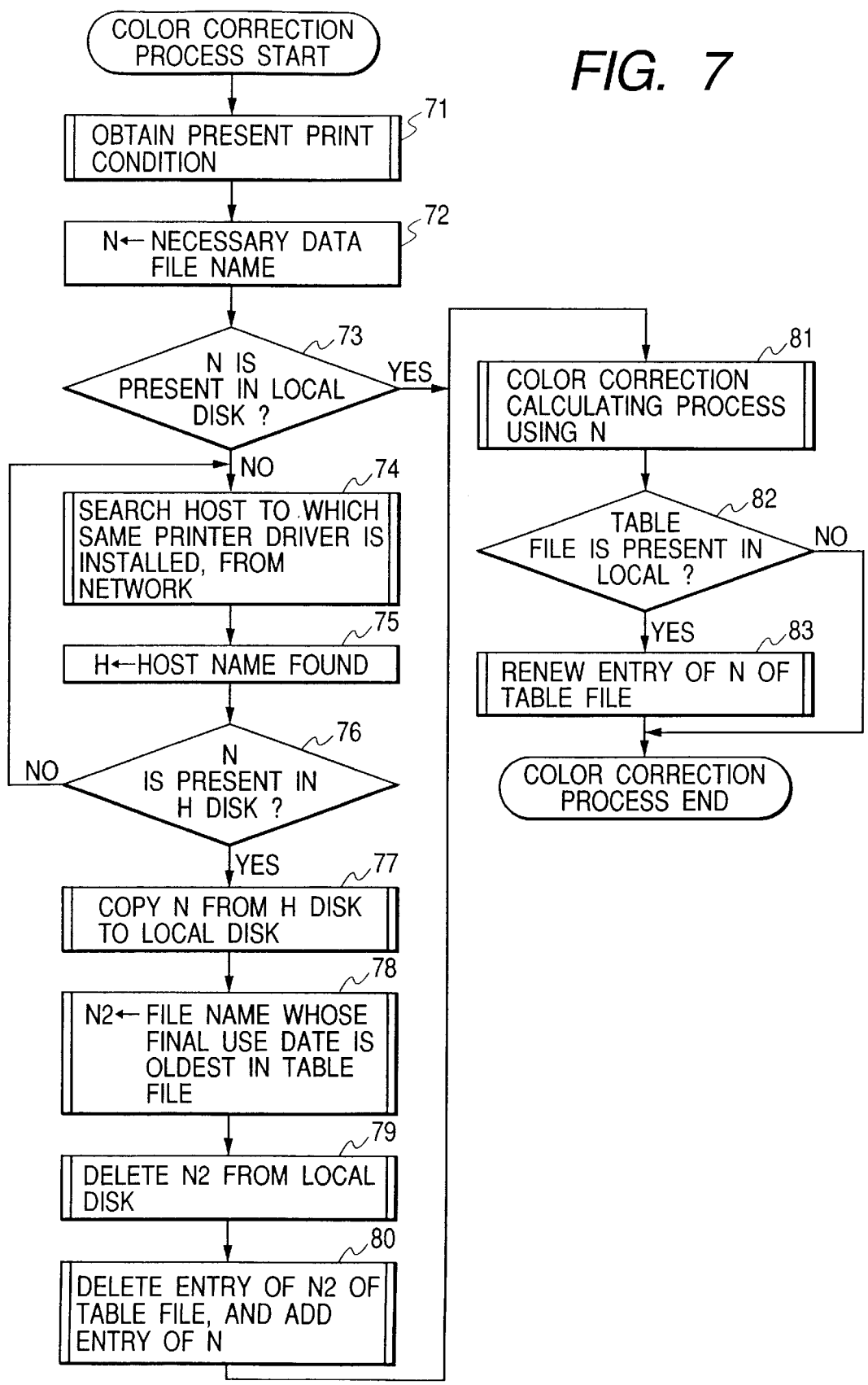
FIG. 7 is a flow chart showing a second color correction method.

FIG. 7 is a flow chart showing a second color correction method, corresponding to the sequence of color correction process with the printer driver and the associated color correction data files installed by the process shown in the flow chart in FIG. 2, wherein 71 to 83 indicate process steps.

The steps 71 to 73, 74 to 77 and 81 in FIG. 7 are respectively same as the steps 12 to 14, 16 to 19 and 20 in FIG. 3.

When the color correction sequence of the printer driver is called by the execution of the printing process by an application software loaded on the RAM 1007 shown in FIGS. 1A and 1B, there are acquired printing conditions, such as the printing medium for printing, image processing method by the printer driver, kind of the ink to be used etc. 71. Then, based on the printing conditions, a data file name required in the color correcting calculation to be explained later is selected and is stored in a character train variable N 72.

Then there is discriminated whether the data file of the file name N selected in the step 72 is present in the color correction data file storage area in the hard disk 1006 of the host computer 1001 73, and, if present, the sequence proceeds to a step 81, but, if absent, a step 74 is executed.

A next step 74 uses the network communication function of the operating system to search, in the computer network 3001, another host computer installed with the printer driver same as the above-mentioned one. It is assumed that the host computer searched in this step is the host computer 2001 shown in FIGS. 1A and 1B.

Then the host name of the host computer 2001 found in the step 4 is stored in a character train variable H 75, and the network communication function of the operating system is used to discriminate (search) whether the data file of the file name N is present in the color correction data file storage area in the hard disk 2006 of the host computer 2001 76. If absent, the sequence returns to the step 74 to search still another host computer satisfying the search condition of the step 74.

On the other hand, if the step 76 identifies the data file N in the host computer H, the sequence proceeds to a next step 77.

In the case 77, the network communication function of the operating system is used to transfer the data file of the file name N selected in the step 71, from the hard disk 2006 of the host computer 2001 searched n the step 74 to the hard disk 1006 of the host computer 1001.

Then executed are steps 78 to 80 for managing the data files based on the frequency of use thereof in the host computer 1001.

A step 78 searches, in the table file stored in the hard disk 1006, a file with the oldest value in the final use date column R1002, and the file name of such file in a character train variable N2.

Then the above-mentioned data file N2 is deleted from the hard disk 1006 79, then the entry of the file N2 deleted in the step 79 is deleted and the entry of the file N copied in the hard disk 1006 in the step 77 is newly added 80.

Then the data file of the file name N is read from the hard disk 1006, then there is executed the color correction calculation optimum for the printing conditions acquired in the step 71, and there is discriminated whether the above-mentioned table file is present in the hard disk 1006 (steps 82). If absent, the color correction process is terminated, but, if present, the sequence proceeds to a step 83.

A step 83 renews, in the table file present in the hard disk 1006, the final use date column R1002 of the entry of the file N used in the step 81 and the color correction process is terminated.

In the step 78, the file with the oldest final date of use is regarded as the data file of least importance in the host computer 1001 and such file is subjected to deletion in the step 79. In this manner the data files with high frequency of actual use are retained in the hard disk 1006 while the number of the data files therein is maintained constant.

In the following there will be explained, with reference to a flow chart shown in FIG. 8, a second uninstalling method for the printer driver and the associated color correction data files from the host computer 1001. It is assumed that such printer driver and associated color correction data files have been installed according to the flow chart shown in FIG. 2, and a table file as shown in FIG. 6 is prepared in the hard disk 1006 in case the step 5 in FIG. 2 finds another host computer installed with the same printer driver. Also such data files may have been utilized in the color correction process according to the flow chart shown in FIG. 7.

Figure 8:
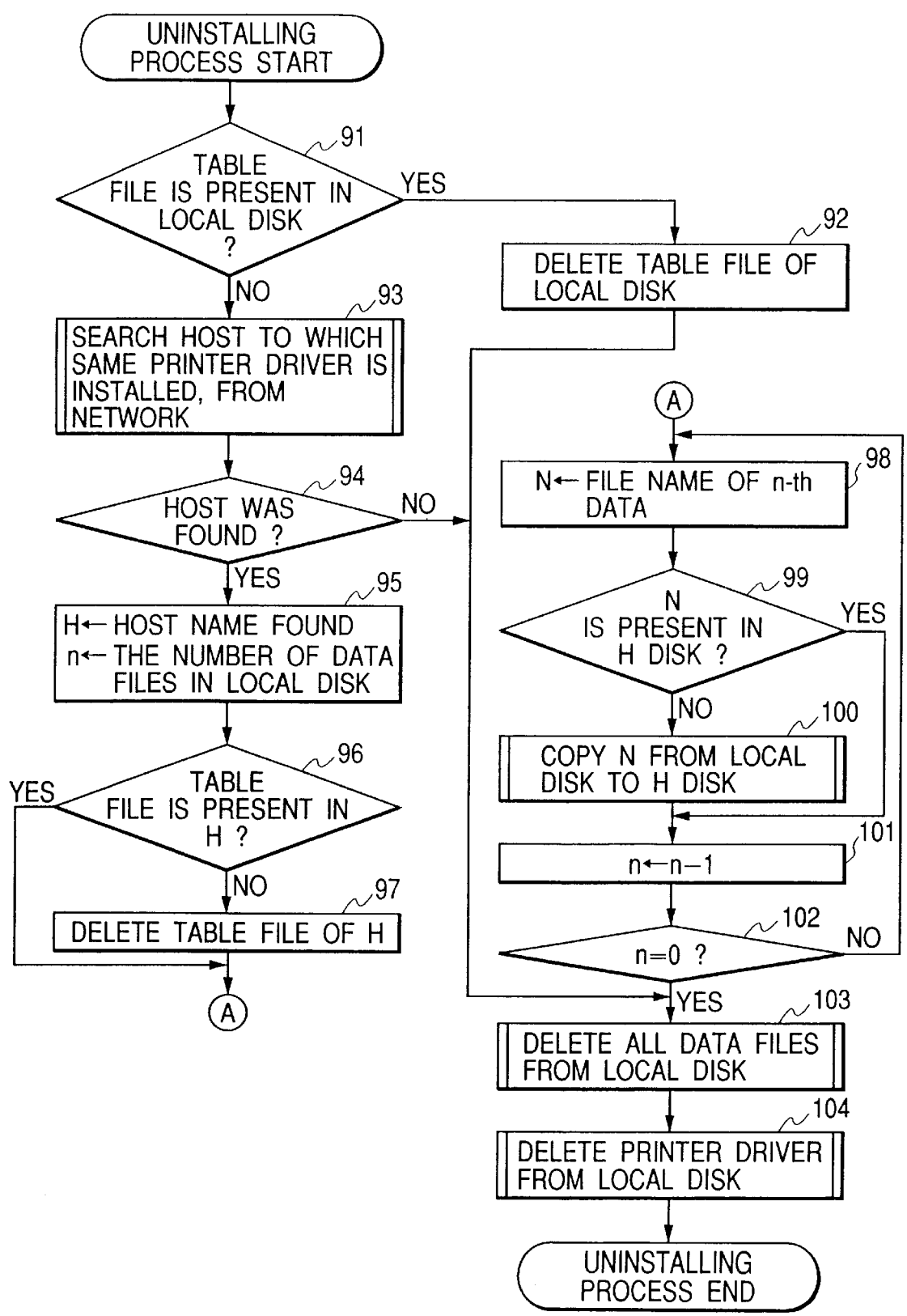
FIG. 8 is a flow chart showing a second uninstalling method.

FIG. 8 is a flow chart showing a second uninstalling method, corresponding to the sequence of uninstallation of the printer driver and the associated color correction data files from the host computer 1001, wherein 91 to 104 indicate process steps. The steps 93 to 95 and 98 to 104 in FIG. 8 are respectively same as the steps 32 to 34 and 35 to 41 in FIG. 4.

When the user of the host computer 1001 instructs the start of the uninstalling process by the keyboard mouse 1011, the above-mentioned printer driver stored in the hard disk 1006 is loaded in the RAM 1007 and the execution of the following uninstalling sequence is initiated by the CPU 1003.

At first the host computer 1001 discriminates whether the table file shown in FIG. 6 is present in the hard disk 1006 91, and, if present, the table file shown in FIG. 6 is deleted from the hard disk 1006 (steps 92) and the sequence proceeds to a step 103.

On the other hand, if the host computer 1001 identifies in the step 91 that the table file shown in FIG. 6 is absent in the hard disk 1006, the network communication function of the operating system is used to search, in the computer network 3001, another host computer installed with the printer driver same as the above-mentioned one 93.

Then a step 94 discriminates the result of search in the step 93, and, if another host computer mentioned above is not found, the sequence proceeds to a step 103, but, if it is found, the sequence proceeds to a next step 95. It is assumed that another host computer is the host computer 2001 in FIGS. 1A and 1B.

In a next step 95, the host name of the host computer 2001 searched in the step 93 is stored in the character train variable H, and the number of the color correction data files associated with the printer driver present in the hard disk 1006 is stored in an integer variable n. The integer variable n indicates the remaining number of the color correction data files, to be subjected to the sequence in following steps 98 to 102. Then the network communication function of the operating system is used to discriminate whether the table file is present in the host H 96, and, if absent, the sequence proceeds to a step 98, but, if present, the table file is deleted from the host H 97.

In a next step 98, the file name of an n-th file among the above-mentioned color correction data files is stored in the character train variable N.

Then the network communication function of the operating system is used to discriminate (search), in a step 99, whether a data file with the file name N is present in the color correction data file storage area in the hard disk 2006 of the host computer 2001, and, if present, the sequence proceeds to a step 101 but, if absent, the sequence proceeds to a next step 100.

Then the network communication function of the operating system is used, in a step 100, to transfer the data file of the file name N from the hard disk 1006 of the host computer 1001 to the hard disk 2006 of the host computer 2001 searched in the step 93.

Then the value of the variable n is decreased by one 101 and there is discriminated if the variable n is "0" 102. If not, the sequence returns to the step 98 to execute the process for a next data file.

On the other hand, if the step 102 identifies that the variable n is "0", the sequence proceeds to a next step 103 since the process for all the data files has been completed.

A next step 103 deletes all the color correction data files associated with the printer driver and present in the hard disk 1006.

Then the printer driver itself present in the hard disk 1006 is deleted 104, whereupon the uninstalling process for the printer driver and all the associated color correction data files is terminated.

The above-described process allows to reduce the frequency of data file transfers through the network at the color correction process, in comparison with the first embodiment.

Also, the size of the above-mentioned table file is sufficiently small and merely occupies a negligible capacity in the hard disk.

Fourth Embodiment

In the foregoing first to third embodiments, in the host computer in which all the data files have been copied at the installation, all the data files are retained in the hard disk up to the uninstallation. There may however be adopted an embodiment wherein, even in the host computer in which all the data files have been copied at the installation, the data files of a lower frequency of use are moved to another host computer having a higher frequency of use for such data files, and such embodiment will be explained in the following.

In the foregoing first to third embodiments, as explained above, in the host computer in which all the data files have been copied at the installation, all the data files remain in the local hard disk regardless of the frequency of execution of the color correction process in such host computer, until the printer driver is uninstalled.

The present embodiment executes the following process in addition to the process of the flow chart of the first embodiment shown in FIG. 2.

A table file as shown in FIG. 6 is prepared in the hard disk 1006 in the step 2 in FIG. 2. In such table file, the file names of all the color correction data files associated with the printer driver are recorded in the file name column R1001. Also the date and time of installation is recorded in the final use date column R1002 of the table file, in connection with each file name.

In the following there will be explained, with reference to the flow chart in FIG. 9, a third color correction method in the image output from the host computer 1001 to the color printer 1013. It is assumed that the printer driver for controlling the color printer 1013 is installed according to the flow chart shown in FIG. 2 and that a table file as shown in FIG. 6 is prepared.

Figure 9:
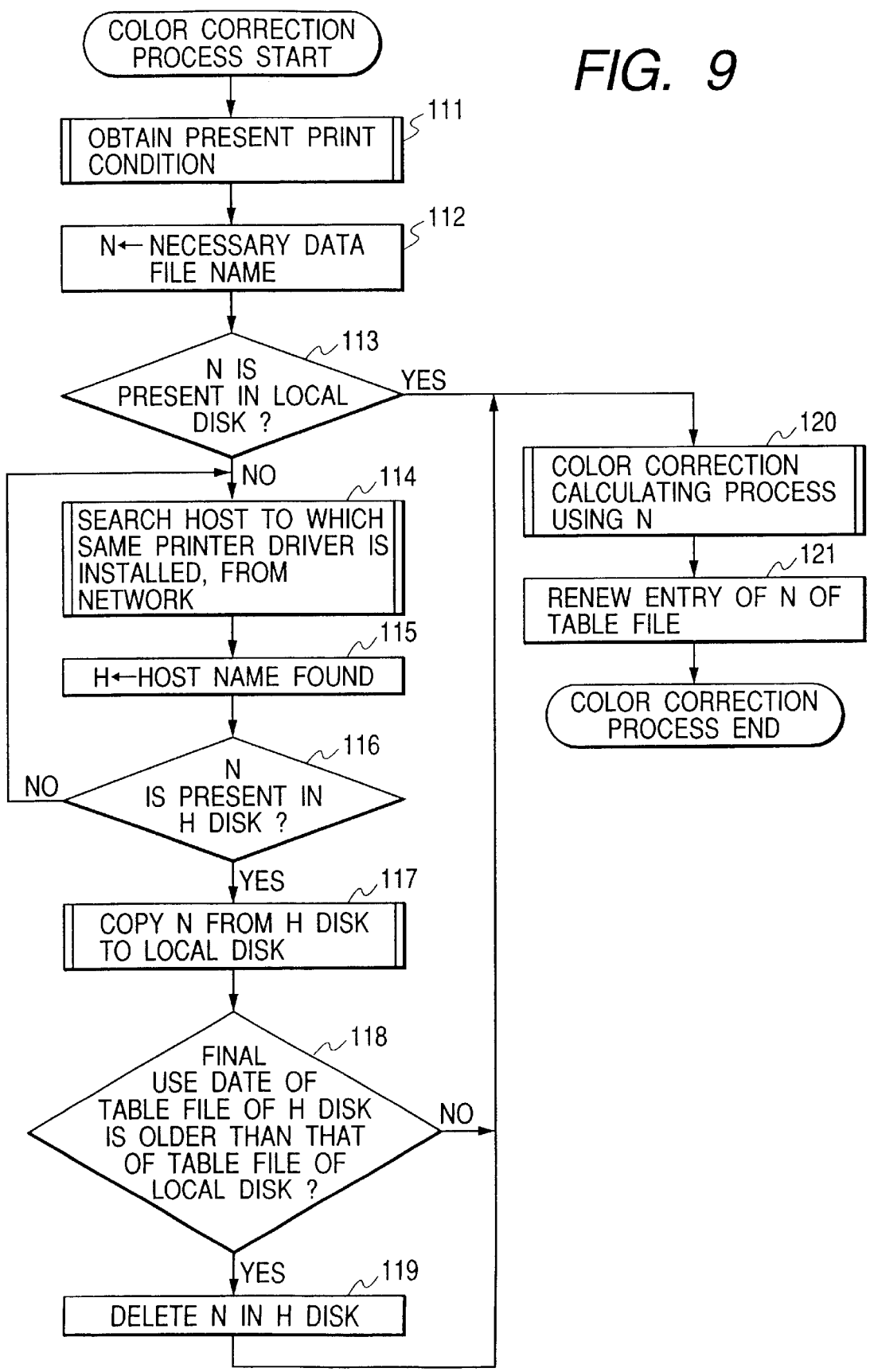
FIG. 9 is a flow chart showing a third color correction method.

FIG. 9 is a flow chart showing a third color correction method, corresponding to the sequence of color correction process in the printing process utilizing the printer driver and the associated color correction data files installed by the process shown in the flow chart in FIG. 2, wherein 111 to 121 indicate process steps.

The steps 111 to 113, 114 to 117 and 120 in FIG. 9 are respectively same as the steps 12 to 14, 16 to 19 and 20 in FIG. 3.

When the color correction sequence of the printer driver is called by the execution of the printing process by an application software loaded on the RAM 1007 shown in FIGS. 1A and 1B, there are acquired printing conditions, such as the printing medium for printing, image processing method by the printer driver, kind of the ink to be used etc. 111. Then, based on the printing conditions, a data file name required in the color correcting calculation to be explained later is selected and is stored in a character train variable N 112.

Then there is discriminated whether the data file of the file name N selected in the step 112 is present in the color correction data file storage area in the hard disk 1006 of the host computer 1001 113, and, if present, the sequence proceeds to a step 120, but, if absent, a step 114 is executed.

A next step 114 uses the network communication function of the operating system to search, in the computer network 3001, another host computer installed with the printer driver same as the above-mentioned one. It is assumed that the host computer searched in this step is the host computer 2001 shown in FIGS. 1A and 1B.

Then the host name of the host computer 2001 found in the step 114 is stored in a character train variable H 115, and the network communication function of the operating system is used to discriminate (search) whether the data file of the file name N is present in the color correction data file storage area in the hard disk 2006 of the host computer 2001 116. If absent, the sequence returns to the step 114 to search still another host computer satisfying the search condition of the step 114.

On the other hand, if the step 116 identifies the data file N in the host computer H, the sequence proceeds to a next step 117.

In a step 117, the network communication function of the operating system is used to transfer the data file of the file name N selected in the step 111, from the hard disk 2006 of the host computer 2001 searched in the step 114 to the hard disk 1006 of the host computer 1001.

Then the network communication function of the operating system is used to compare the final dates of use of the data file of the file name N, transferred in the step 117, in the table files in the hard disk 1006 of the host computer 1001 and in the hard disk 2006 of the host computer 2001 and there is discriminated whether the final date of use in the table file of the hard disk 2006 of the host computer 2001 is older than that in the table file of the hard disk 1006 of the host computer 1001 118, and, if not, the sequence proceeds to a step 120.

On the other hand, if the step 118 identifies that the final date of use in the host computer 2001 is older than that in the host computer 1001, the network communication function of the operating system is used to delete the file of the file name N, transferred in the step 117, from the hard disk 2006 of the host computer 2001.

Then the data file of the file name N selected in the step 112 is read from the hard disk 1006, then the color correction calculation optimum for the printing conditions acquired in the step 111 is executed 120, and there is renewed the final use date column R1002 of the entry of the file N used in the step 120 whereupon the color correction process is terminated.

The present embodiment also executes the following process, in addition to the process shown in the flow chart in FIG. 4.

A step 40 in FIG. 4 deletes all the color correction data files associated with the printer driver, present in the hard disk 1006, and also deletes the table file shown in FIG. 6 from the hard disk 1006.

The above-described process allows to reduce the capacity occupied by the data files in the hard disk of the host computer, because, even in the host computer in which all the data files have been copied at the installing process, the data files of lower frequency of use are moved to another host computer having a higher frequency of use for such data files.

Also in the present embodiment, the size of the table file mentioned file is sufficiently small and is negligible in the capacity of the hard disk.

As explained in the foregoing, in an environment where plural host computers connected through a computer network utilize the color printers of a same kind, the copying of the color correction data files that can be shared within the computer network is dispensed with to reduce the installing time for such color correction data files, and to reduce the area occupied by the color correction data files in the external memory of the host computer.

It is also possible to appropriately recover, at the installation, the data files lost on the computer network mentioned above.

It is furthermore possible to reduce the frequency of file transfers at the color correction process utilizing the installed data files, thereby increasing the speed of the color correction process.

It is furthermore possible to appropriately uninstall the color correction data file group shared in the above-mentioned computer network.

It is furthermore possible to reduce the amount of file transfer, thereby increasing the speed of uninstallation.

It is furthermore possible to appropriately execute the color correction process, by sharing the color correction data files, installed by the first installing method, within the above-mentioned computer network.

It is furthermore possible to reduce the area occupied by the color correction data files in the external memory.

In the foregoing first to fourth embodiments there have been explained the installing method and the uninstalling method of the printer driver for the color printer connected to the computer network so as to be capable of communication therewith and the data file group associated with such printer driver and the color correction process utilizing such printer driver and such data file group, but the present invention is not limited to the printer driver for the color printer and the data file group associated with such printer driver and is naturally likewise applicable to a control program for an electronic device connected to the host computer so as to be capable of communication therewith and adapted to input or output a color image and a color correcting data file group associated with such electronic device. The present invention is furthermore applicable to installation and uninstallation of a control program for an electronic device other than the above-mentioned color image inputting/outputting electronic device and a data file group associated with such control program.

Figure 12:
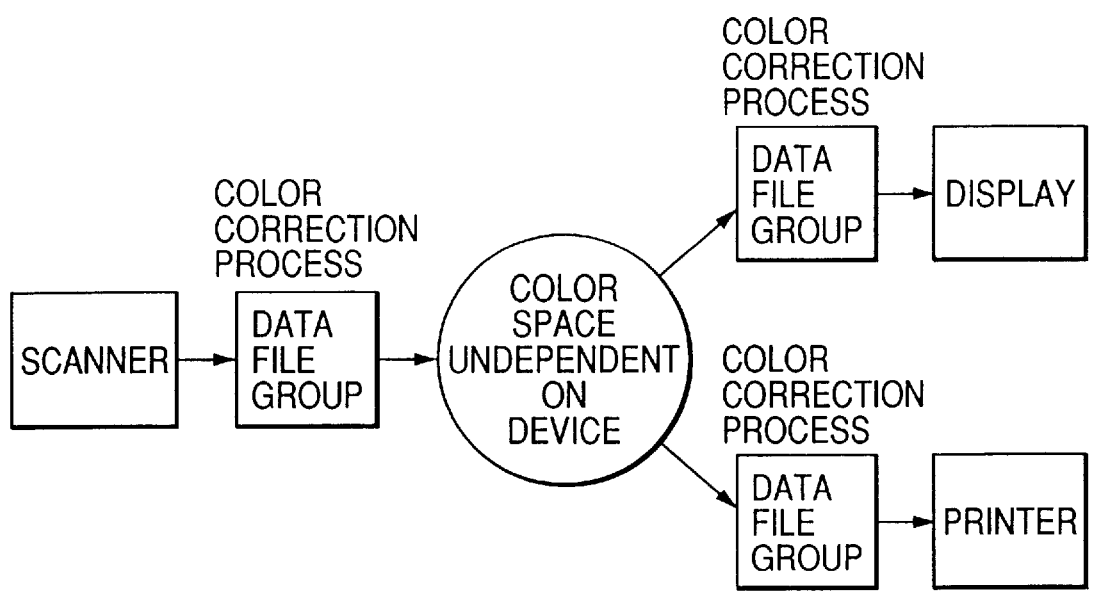
FIG. 12 is a view showing the concept of a color matching system.

Also the above-mentioned electronic device can be any device in which the color matching system shown in FIG. 12 is applied, such as a scanner, a digital camera or a display.

Furthermore, the color printer can be of electrophotographic type, ink jet type, sublimation type or any other type.

Also in the foregoing first to fourth embodiments, the printer driver and the associated color correction data files are read and installed from the CD-ROM, but they may be read and installed from another recording medium such as a floppy disk, a magnetooptical disk, a magnetic tape or the like.

Furthermore, the printer driver and the associated color correction data files may be acquired through a network.

In the following there will be explained, with reference to memory maps shown in FIGS. 10 and 11, the configuration of data processing programs readable by the information processing apparatus.

Figure 10:
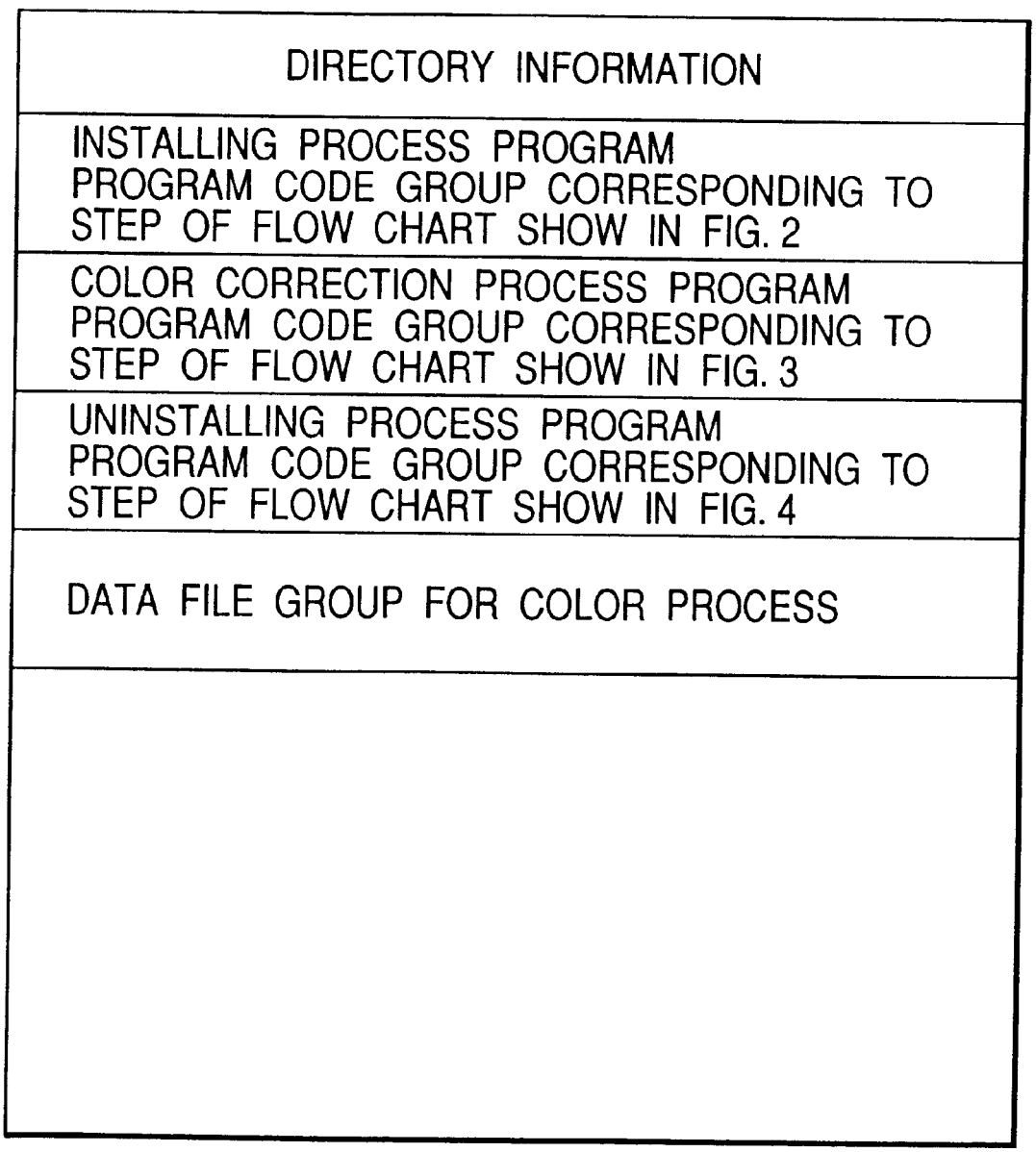

FIGS. 10 and 11 show memory maps on a memory medium, storing various data processing programs readable by the information processing apparatus.

Though not particularly illustrated, there may be additionally recorded information for managing the program stored in the memory medium such as a version information or the name of the preparing person, and the information depending on the operating system etc. of the program reading device, such as an icon for identifying the program.

The above-mentioned directory also manages the data belonging to the various programs. Also there may be stored a thawing program, in case the program or data to be installed are compressed.

The functions of the foregoing embodiments, shown in FIGS. 2, 3, 4, 5, 7, 8 and 9 may be realized by the host computer by an externally installed program. The present invention is applicable also in case the information group, including the program, is supplied to the output device from a memory medium such as a CD-ROM or a flush memory or from an external memory medium through the network.

The object of the present invention can naturally be attained also in a case where by supplying a system or an apparatus with a memory medium storing program codes of a software for realizing the functions of the aforementioned embodiments is supplied to a system or an apparatus and a computer (CPU or MPU) in the above-mentioned system or apparatus reads and executes the program codes stored in the memory medium to attain the objects of the present invention.

In such case the program codes themselves read from the memory medium realize the novel functions of the present invention, and the memory medium storing the program codes constitutes the present invention.

The memory medium storing such program codes can be, for example, a floppy disk, a hard disk, an optical disk, a magnetooptical disk, a CD-ROM, a CD-R, a magnetic tape, a non-volatile memory card, a ROM or an EEPROM.

The present invention also includes not only a case where the functions of the aforementioned embodiments are realized by the execution of the read program codes by the computer but also a case where the operating system or the like functioning on the computer executes all the process or a part thereof according to the instruction of such program codes thereby realizing the functions of the aforementioned embodiments.

The present invention further includes a case wherein the program codes read from the memory medium are once stored in a function expansion board inserted into the computer or a memory provided in a function expansion unit connected to the computer, and a CPU or the like provided in the function expansion board or the function expansion unit executes all the process or a part thereof according to the instructions of such program codes, thereby realizing the functions of the aforementioned embodiments.

Furthermore, the present invention may be applied to a system consisting of plural equipment or an apparatus consisting of a single equipment. The present invention is naturally applicable further to a case where the present invention is attained by the supply of a program to a system or an apparatus. In such case, a system or an apparatus can enjoy the effects of the present invention, by reading a program represented by a software for realizing the present invention from a memory medium into such system or apparatus.

Furthermore, a system or an apparatus can enjoy the effects of the present invention by downloading and reading a program represented by a software for realizing the present invention, by a communication program, from a data base on a network.

The present invention is not limited to the foregoing embodiments but is subject to any and all modifications within the scope and spirit of the appended claims.

What is claimed is:

1. An information processing apparatus connected in communicable manner with an electronic device for inputting or outputting a color image and provided with a memory unit in which a first control program for said electronic device and plural color correction data files associated with the first control program are installed from a computer readable predetermined memory medium and executes a color correction process based on any of the plural color correction data files, said apparatus comprising:

selection means for selecting any of the color correction data files according to the condition of a color image processing executed by said electronic device;

first discrimination means for discriminating whether the color correction data file selected by said selection means is present in the memory unit;

third search means adapted, when said first discrimination means discriminates that the color correction data file selected by said selection means is not present in the memory unit, to search another information processing apparatus installed with a second control program for controlling an electronic device similar in characteristics to the electronic device controlled by the first control program;

second discrimination means for discriminating whether the color correction data file selected by said selection means is installed in another information processing apparatus searched by said third search means; and transfer means adapted, when said second discrimination means discriminates that the color correction data file selected by said selection means is installed in said another information processing apparatus, to transfer the color correction data file selected by said selection means from said another information processing apparatus to said information processing apparatus itself.

2. An information processing apparatus according to claim 1, further comprising first deletion means for deleting any of the plural color correction data files stored in the memory unit.

3. An information processing apparatus according to claim 2, wherein said first deletion means to sets importance on each of the plural color correction data files stored in said memory means and to determine, based on a set importance, the deletion of any of the plural color correction data files stored in the memory unit.

4. An information processing apparatus according to claim 3, wherein said first deletion means dynamically determines the importance of each of the plural color correction data files stored in the memory unit, based on the frequency of use of each of the color correction data files by the information processing apparatus itself.

5. An information processing apparatus according to claim 1, further comprising second deletion means for deleting the color correction data file selected by said selection means from said another information processing apparatus after the transfer by said transfer means.

6. An information processing apparatus according to claim 5, wherein said second deletion means sets importance on each of the color correction data files installed in said another information processing apparatus and selected by said selection means, and to determine whether or not to delete the data files installed in said another information processing apparatus and selected by said selection means from said another information processing apparatus, based on the set importance, after the transfer by said transfer means.

7. An information processing apparatus according to claim 6, wherein said second deletion means dynamically sets the importance of each of the color correction data file installed in said another information processing apparatus and selected by said selection means and the color correction data file transferred by said transfer means, based on the frequency of use in said another information processing apparatus of the color correction data file selected by said selection means.

8. An information processing method for an information processing apparatus connected in communicable manner with an electronic device for inputting or outputting a color image and provided with a memory unit in which a first control program for said electronic device and plural color correction data files associated with the first control program are installed from a computer readable predetermined memory medium and executes a color correction process based on any of the plural color correction data files, said method comprising:

a selection step of selecting any of the color correction data files according to a condition of a color image processing executed by said electronic device;

a first discrimination step of discriminating whether the color correction data file selected in said selection step is present in the memory unit;

a third search step adapted, when said first discrimination step discriminates that the color correction data file selected in said selection step is not present in the memory unit, to search another information processing apparatus installed with a second control program for controlling an electronic device similar in characteristics to the electronic device controlled by the first control program;

a second discrimination step of discriminating whether the color correction data file selected in said selection step is installed in another information processing apparatus searched in said third search step; and a transfer step adapted, when said second discrimination step discriminates that the color correction data file selected in said selection step is installed in said another information processing apparatus, to transfer the color correction data file selected in said selection step from said another information processing apparatus to said information processing apparatus itself.

9. A computer readable memory medium storing a program for an information processing method for an information processing apparatus connected in communicable manner with an electronic device for inputting or outputting a color image and provided with a memory unit in which a first control program for said electronic device and plural color correction data files associated with the first control program are installed from a computer readable predetermined memory medium and executes a color correction process based on any of the plural color correction data files, said method comprising:

a selection step of selecting any of the color correction data files according to the condition of a color image processing executed by said electronic device;

a first discrimination step of discriminating whether the color correction data file selected in said selection step is present in the memory unit;

a third search step adapted, when said first discrimination step discriminates that the color correction data file selected in said selection step is not present in the memory unit, to search another information processing apparatus installed with a second control program for controlling an electronic device similar in characteristics to the electronic device controlled by the first control program;

a second discrimination step of discriminating whether the color correction data file selected in said selection step is installed in another information processing apparatus searched in said third search step; and a transfer step adapted, in case said second discrimination step discriminates that the color correction data file selected in said selection step is installed in said another information processing apparatus, to transfer the color correction data file selected in said selection step from said another information processing apparatus to said information processing apparatus itself.

* * * * *

UNITED STATES PATENT AND TRADEMARK OFFICE
CERTIFICATE OF CORRECTION

PATENT NO. : 6,603,571 B1
DATED : August 5, 2003
INVENTOR(S) : Masakazu Nomoto

It is certified that error appears in the above-identified patent and that said Letters Patent is hereby corrected as shown below:

Column 1,
Line 17, "driver" should read -- driver, --;
Line 24, "such" should read -- such a --;
Line 35, "In the" should read -- The --; and
Line 38, "device" should read -- devices --.

Column 2,
Line 7, "At" should read -- In --; and
Line 9, "At" should read -- In --.

Column 4,
Line 59, "Keyboard" should read -- Keyboard and --;
Line 60, "Keyboard mice" should read -- keyboards and mice --; and
Line 65, "Keyboard mice" should read -- keyboards and mice --.

Column 5,
Line 28, "and" should be deleted; and
Line 34, "keyboard" should read -- keyboard and --.

Column 6,
Line 33, "another" should read -- other --; and
Line 37, "computer" should read -- computers --.

Column 7,
Line 1, "detailedly" should read -- in detail --;
Line 21, "kind" should read -- a kind --; and
"etc. step" should read -- , etc., in step --;
Line 36, "step" should read -- in step --;
Line 46, "still another" should read -- for still another --;
Line 52, "fine" should read -- file --;
Line 54, "n" should read -- in --; and
Line 64, "deleted" should read -- deleted in --.

Column 8,
Line 25, "detailedly" should read -- in detail --.

Column 9,
Line 16, "38" should read -- in step 38 --;
Line 17, "there" should read -- it --;
Line 27, "41," should read -- in step 41, --; and
Line 54, "to discriminate" should read -- discriminates --.

UNITED STATES PATENT AND TRADEMARK OFFICE
CERTIFICATE OF CORRECTION

PATENT NO. : 6,603,571 B1
DATED : August 5, 2003
INVENTOR(S) : Masakazu Nomoto

It is certified that error appears in the above-identified patent and that said Letters Patent is hereby corrected as shown below:

Column 10,
Line 31, "keyboard mouse" should read -- keyboard and mouse --;
Line 36, "51," should read -- in step 51, --;
Line 39, "52." should read -- in step 52. --;
Line 41, "53," should read -- in step 53, --;
Line 54, "step" should read -- in step --; and
Line 63, "56," should read -- in step 56, --.

Column 11,
Line 15, "step" should read -- in step --.

Column 12,
Line 20, "date" (second occurrence) should read -- data --;
Line 49, "kind" should read -- a kind --;
Line 50, "etc. 71." should read -- , etc., in step 71. --; and
Line 57, "73," should read -- in step 73, --.

Column 13,
Line 3, "76." should read -- in step 76. --;
Line 13, "n" should read -- in --;
Line 23, "79," should read -- in step 79, --;
Line 25, "80." should read -- in step 80. --; and
Line 30, "(steps" should read -- (step --.

Column 14,
Line 2, "91," should read -- in step 91, --;
Line 3, "(steps" should read -- (step --; and
Line 10, "93." should read -- in step 93. --.

Column 15,
Line 32, "prepared." should read -- prepared in step 2 in FIG. 2 --; and
Line 47, "etc." should read -- , etc., in step --.

Column 16,
Line 3, "116." should read -- in step 116. --;
Line 4, "still another" should read -- for still another --; and
Line 24, "118," should read -- in step 118, --.

Column 18,
Line 56, "in" should read -- in a --.

UNITED STATES PATENT AND TRADEMARK OFFICE
CERTIFICATE OF CORRECTION

PATENT NO.   : 6,603,571 B1
DATED        : August 5, 2003
INVENTOR(S)  : Masakazu Nomoto It is certified that error appears in the above-identified patent and that said Letters Patent is hereby corrected as shown below:

Column 19,
Line 1, "and executes" should read -- , for execution of --;
Line 34, "to" should be deleted;
Line 36, "to determine," should read -- determines, --; and
Line 54, "to determine" should read -- determines --.

Column 20,
Line 1, "file" should read -- files --;
Line 9, "in" should read -- in a --;
Line 15, "and executes" should read -- , for execution of --;
Line 45, "in" should read -- in a --; and
Line 51, "and executes" should read -- , for execution of --.

Signed and Sealed this

Third Day of February, 2004

JON W. DUDAS
*Acting Director of the United States Patent and Trademark Office*